(12) United States Patent
Yang et al.

(10) Patent No.: US 10,555,583 B2
(45) Date of Patent: Feb. 11, 2020

(54) AUTOMATIC SHOE-LACING MACHINE AND METHOD FOR PROCESSING A SHOE UPPER

(71) Applicant: POU CHEN CORPORATION, Fu Hsin Hsian, Chang Hwa Hsien (TW)

(72) Inventors: Yu-Fong Yang, Fu Hsin Hsian (TW); Wen-Pao Chang, Fu Hsin Hsian (TW); Zhao-Quan Ke, Fu Hsin Hsian (TW); Yao-Hsin Wang, Fu Hsin Hsian (TW); Chien-Yu Hsu, Fu Hsin Hsian (TW)

(73) Assignee: Pou Chen Corporation (TW)

( * ) Notice: Subject to any disclaimer, the term of this patent is extended or adjusted under 35 U.S.C. 154(b) by 77 days.

(21) Appl. No.: 15/910,537

(22) Filed: Mar. 2, 2018

(65) Prior Publication Data

US 2018/0255880 A1   Sep. 13, 2018

(30) Foreign Application Priority Data

Mar. 10, 2017  (TW) .............................. 106107866 A

(51) Int. Cl.
| | |
|---|---|
| *A43D 11/08* | (2006.01) |
| *G06T 7/70* | (2017.01) |
| *G06T 1/00* | (2006.01) |
| *H04N 5/225* | (2006.01) |

(52) U.S. Cl.
CPC ............ *A43D 11/085* (2013.01); *A43D 11/08* (2013.01); *G06T 1/0014* (2013.01); *G06T 7/70* (2017.01); *A43D 2200/10* (2013.01); *H04N 5/2253* (2013.01); *H04N 5/2256* (2013.01)

(58) Field of Classification Search
CPC .............................. A43D 11/08; A43D 11/085

USPC .......................................................... 12/58.5
See application file for complete search history.

(56) References Cited

U.S. PATENT DOCUMENTS

| | | | | |
|---|---|---|---|---|
| 2,383,538 A | * | 8/1945 | Fossa ................... | A43D 11/085 |
| | | | | 12/58.5 |
| 2,883,687 A | * | 4/1959 | Fossa ................... | A43D 11/085 |
| | | | | 112/253 |

FOREIGN PATENT DOCUMENTS

| | | |
|---|---|---|
| CN | 103876393 A | 6/2014 |
| CN | 104248134 A | 12/2014 |
| CN | 105962543 A | 9/2016 |
| DE | 102017206764 A1 | 11/2017 |
| TW | I581731 | 5/2017 |

OTHER PUBLICATIONS

Office Action issued to Japanese counterpart application No. 2018-043368 by the JPO dated Feb. 19, 2019 (1 page).
Office Action issued to German counterpart application No. 102018203621.7 by the DPMA dated Mar. 21, 2019 (6 pages).

(Continued)

*Primary Examiner* — Marie D Bays
(74) *Attorney, Agent, or Firm* — Lewis Roca Rothgerber Christie LLP

(57) ABSTRACT

An automatic shoe-lacing machine for securing a shoelace onto a shoe upper includes a jig unit, a robotic arm unit and a control unit. The jig unit permits the shoe upper to be disposed thereon. The robotic arm unit is disposed at the proximity of the jig unit. The robotic arm unit simultaneously holds and moves two tipping members of the shoelace for sequentially passing the tipping members through eyelets formed in the shoe upper. The control unit controls the movement of the robotic arm unit.

15 Claims, 14 Drawing Sheets

(56) References Cited

OTHER PUBLICATIONS

The Office Action issued to Korean counterpart application No. 10-2018-0028049 by the KIPO dated Jan. 31, 2019 (4 pages).
Search Report appended to an Office Action issued to Taiwanese counterpart application No. 106107866 dated Oct. 26, 2017, with English Translation (2 pages).

* cited by examiner

AUTOMATIC SHOE-LACING MACHINE AND METHOD FOR PROCESSING A SHOE UPPER

CROSS-REFERENCE TO RELATED APPLICATION

This application claims priority of Taiwanese Invention Patent Application No. 106107866, filed on Mar. 10, 2017.

FIELD

The disclosure relates to an automatic machine and a processing method, and more particularly to an automatic shoe-lacing machine and a method for processing a shoe upper.

BACKGROUND

A conventional shoe-lacing machine disclosed in Chinese Patent Application Publication No. 103876393 is for lacing a shoe upper. The shoe-lacing machine includes a base frame, a movable seat that is movable relative to the base frame in a front-rear direction and that permits the shoe upper to be disposed thereon, a positioning arm that positions the shoe upper relative to the movable seat, and a gripper that is movable relative to the base frame in a left-right direction and that is located above the movable seat.

To lace the shoe upper, the positioning arm holds the shoe upper on the movable seat, the gripper holds one of two opposite ends of a shoelace, and the movable seat moves to the bottom side of the gripper. Then, the gripper reciprocally moves in the left-right direction, and cooperates with the movement of the movable seat in the front-rear direction to run a corresponding half of the shoelace through the shoe upper. Afterward, the gripper holds the other end of the shoelace, and cooperates with the movable seat to run the other half of the shoelace through the shoe upper.

According to the above, since the two halves of the shoelace are separately operated to be secured onto the shoe upper, the conventional shoe-lacing machine is inefficient.

Moreover, during the abovementioned lacing process, the movable seat sequentially moves to predetermined positions to sequentially align eyelets in the shoe upper with the end of the shoelace held by the gripper. If the shoe upper is improperly positioned relative to the movable seat, the ends of the shoelace cannot smoothly pass through the eyelets. Additional manpower is needed to adjust such misalignment.

SUMMARY

Therefore, an object of the disclosure is to provide an automatic shoe-lacing machine that can alleviate at least one of the drawbacks of the prior art.

According to the disclosure, the automatic shoe-lacing machine is for securing a shoelace onto a shoe upper, and includes a jig unit, a robotic arm unit and a control unit. The shoelace has a flexible lace body, and two tipping members that are respectively connected to two opposite ends of the lace body. The shoe upper has two spaced-apart lace stay pieces. Each of the lace stay pieces is formed with a plurality of spaced-apart eyelets. The jig unit permits the shoe upper to be disposed thereon. The robotic arm unit is disposed at the proximity of the jig unit. The robotic arm unit simultaneously holds and moves the tipping members of the shoelace for sequentially passing the tipping members through the eyelets of the shoe upper. The control unit controls the movement of the robotic arm unit.

Another object of the disclosure is to provide a method for securing a shoelace onto a shoe upper by an automatic shoe-lacing machine that can alleviate at least one of the drawbacks of the prior art.

The automatic shoe-lacing machine includes a robotic arm unit and a machine vision unit. The shoelace has a flexible lace body, and two tipping members that are respectively connected to two opposite ends of the lace body. The shoe upper has two spaced-apart lace stay pieces. Each of the lace stay pieces is formed with a plurality of spaced-apart eyelets. The method includes steps of: a) capturing, by the machine vision unit, a digital image that is related to the eyelets of the shoe upper, and determining, by the machine vision unit, the positions of two of the eyelets through which the tipping members of the shoelace would be operated to respectively pass via the digital image; b) passing, by the robotic arm unit, the tipping members respectively through the two eyelets, and moving, by the robotic arm unit, the tipping members away from the shoe upper such that two free end segments of the lace body that respectively connected the tipping members are crossed; c) holding, by the robotic arm unit, the tipping members and rotating the shoe upper and the robotic arm unit relative to each other, such that the two free end segments of the lace body are not crossed; and d) repeating steps a) to c) until the tipping members pass through all the eyelets of the shoe upper.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
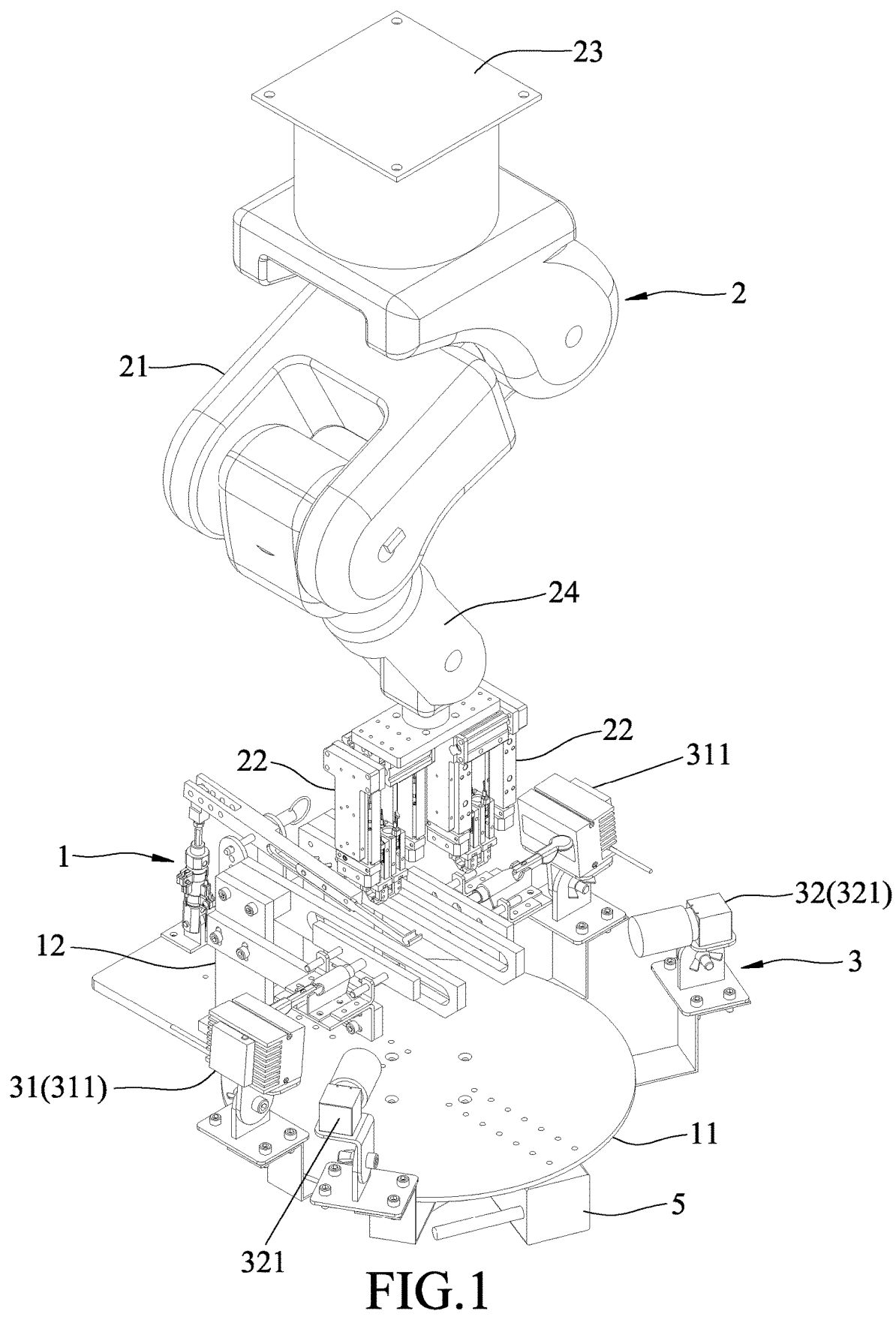
FIG. 1 is a perspective view illustrating a first embodiment of the automatic shoe-lacing machine according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, the first embodiment of the automatic shoe-lacing machine according to the disclosure is for securing a shoelace 8 (see FIG. 4) onto a shoe upper 9 (see FIG. 4), and includes a jig unit 1, a robotic arm unit 2, a machine vision unit 3 and a control unit 4.

Figure 5:
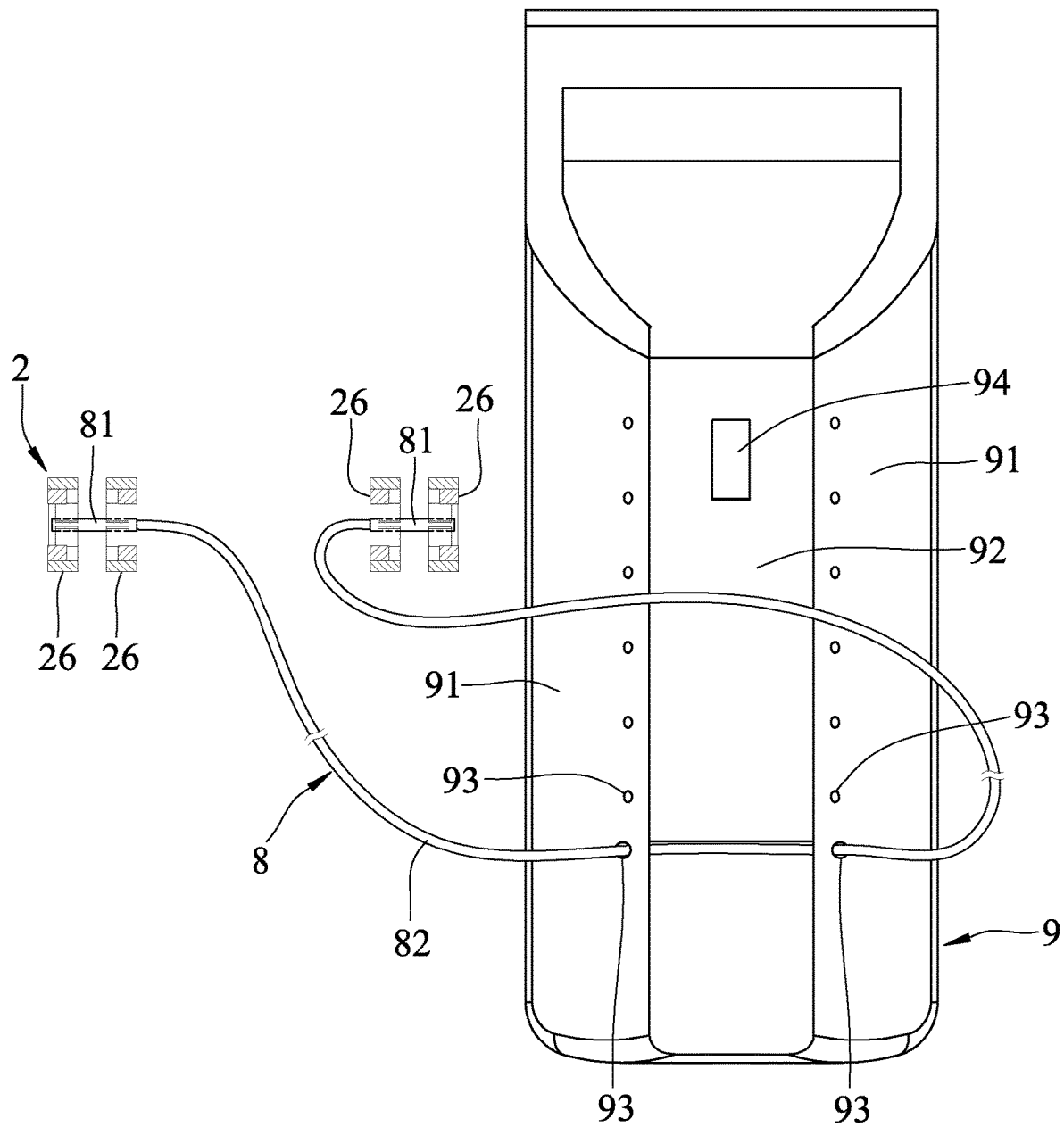
FIGS. 5 to 12 are top views illustrating the first embodiment securing the shoelace onto the shoe upper.

Referring further to FIG. 5, the shoelace 8 has a flexible lace body 82, and two tipping members 81 (e.g., aglets) that are respectively connected to two opposite ends of the lace body 82. The shoe upper 9 has two spaced-apart lace stay pieces 91, and a tongue 92 that is located between the lace stay pieces 91. Each of the lace stay pieces 91 is formed with a plurality of spaced-apart eyelets 93. The tongue 92 has an upper surface, and a tongue loop 94 that is disposed on the upper surface.

Figure 2:
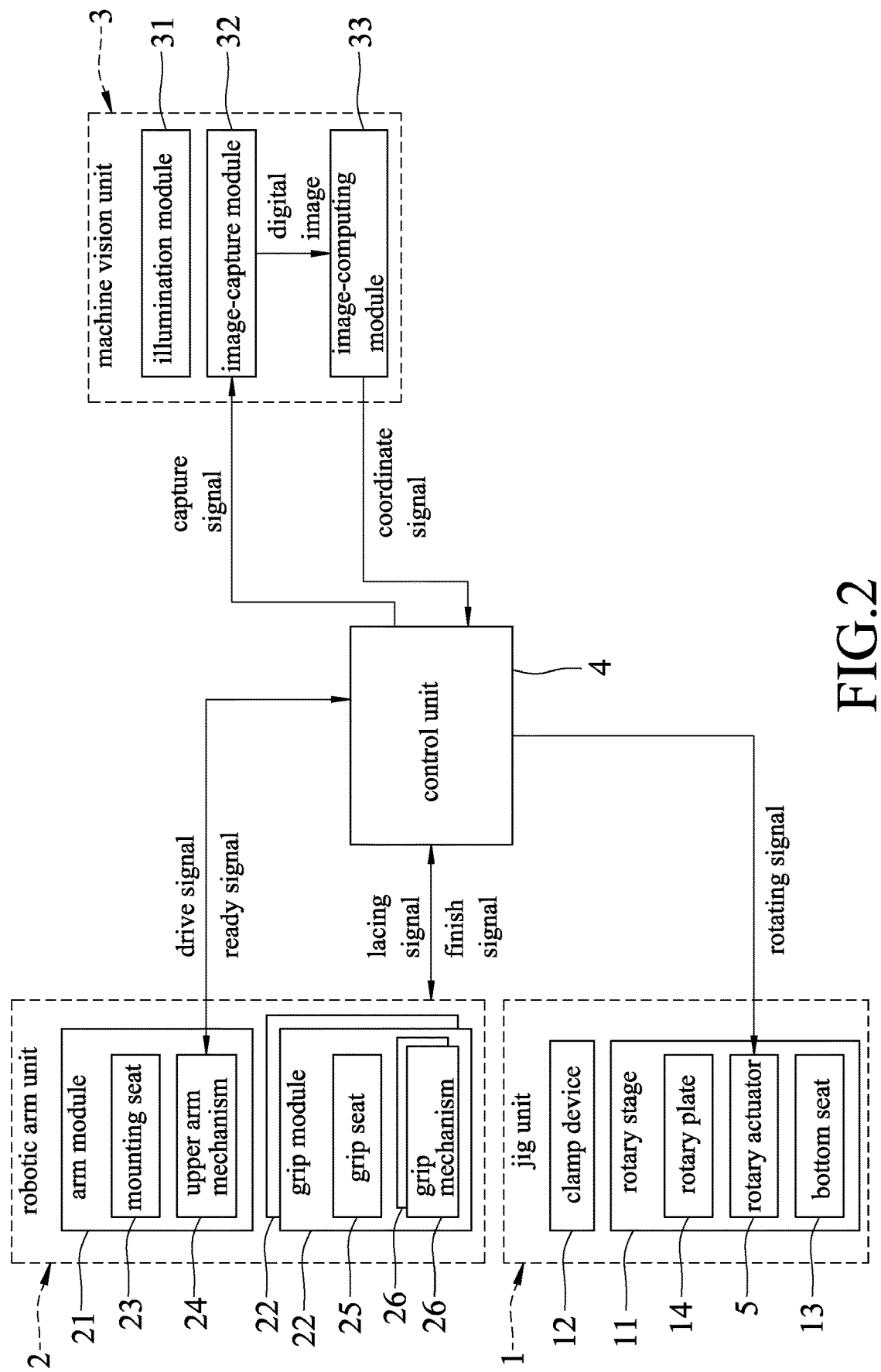
FIG. 2 is a block diagram illustrating the elements of the first embodiment.
Figure 3:
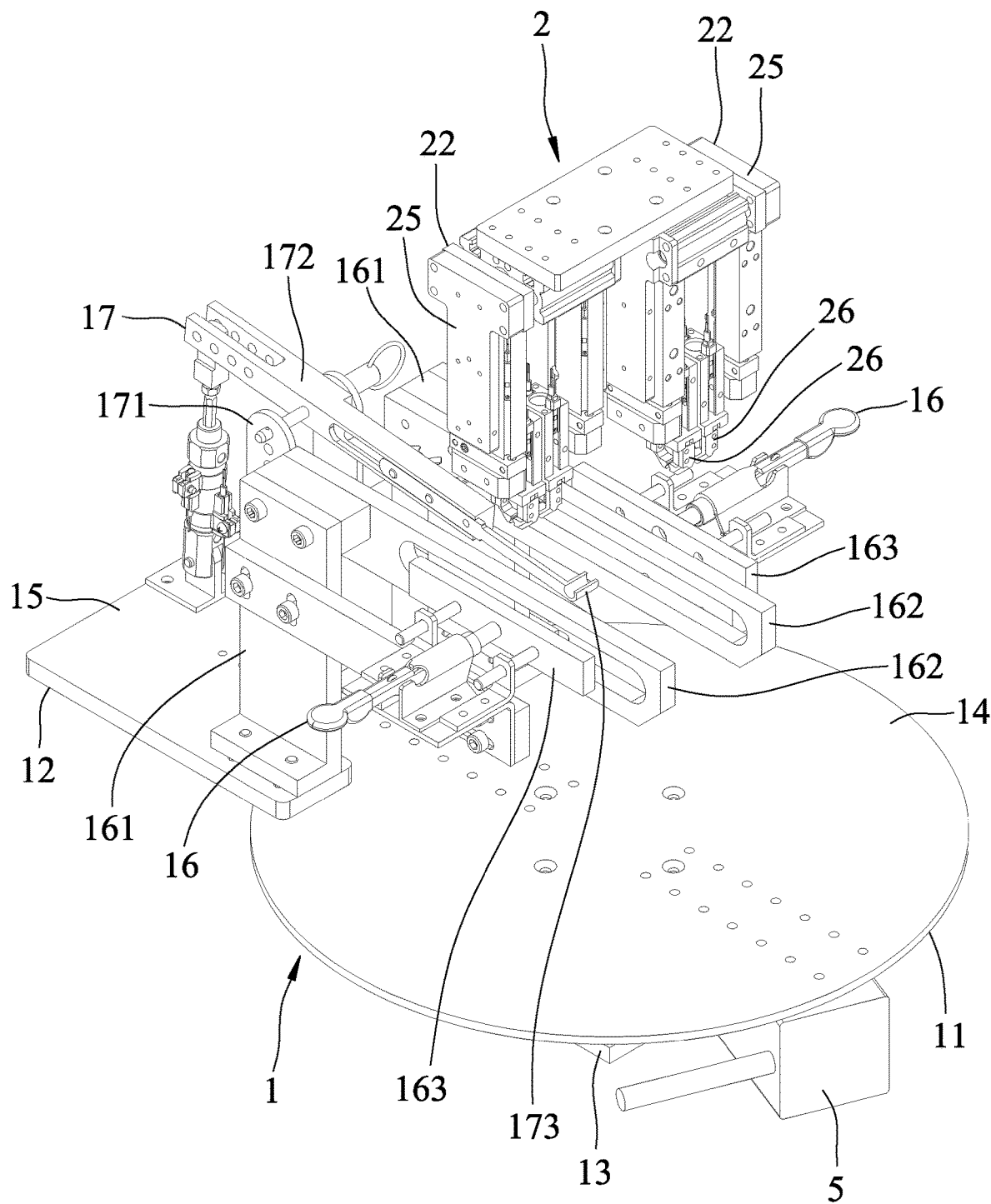
FIG. 3 is a perspective view illustrating a portion of the first embodiment.
Figure 4:
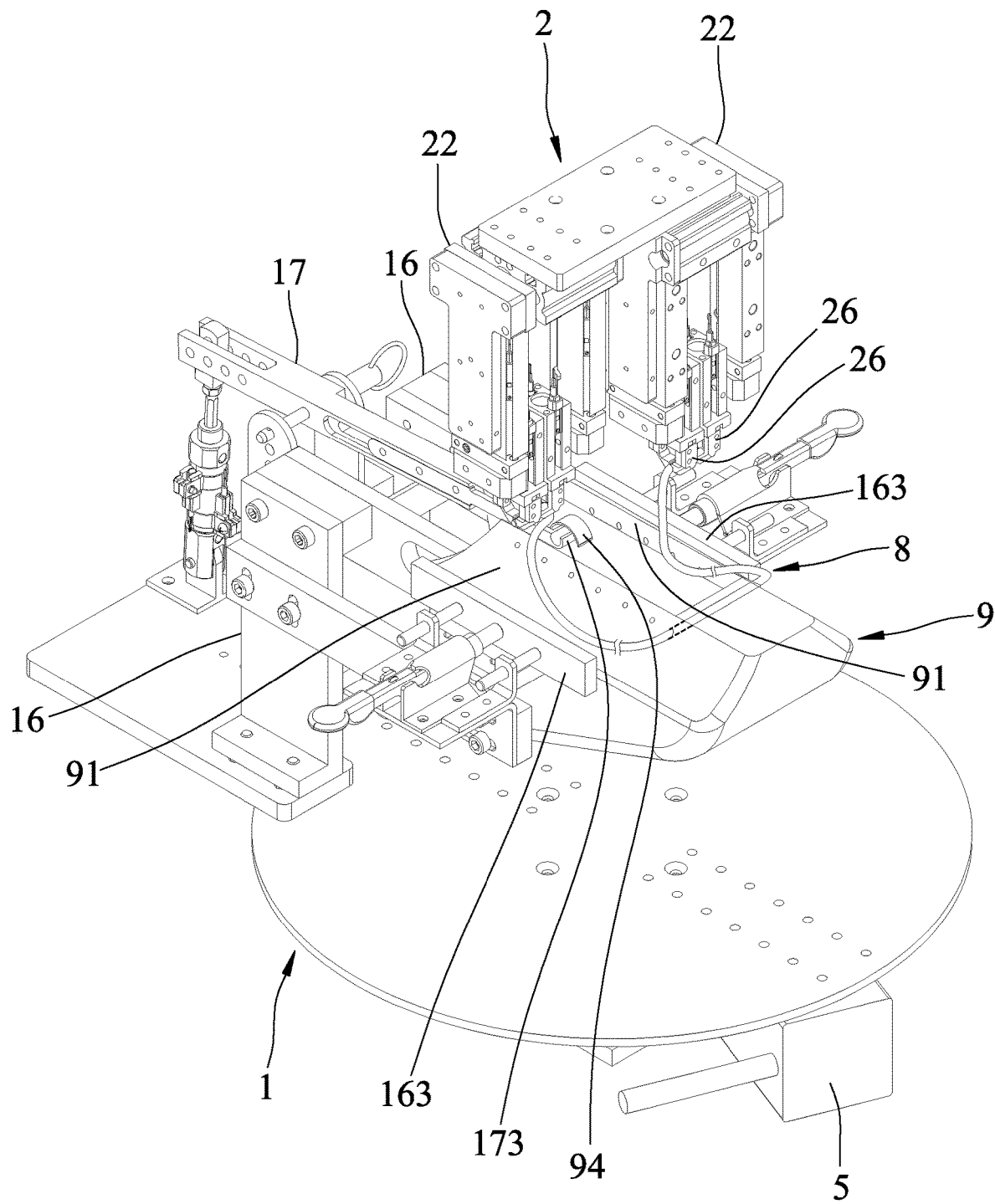
FIG. 4 is a view similar to FIG. 3, illustrating a shoe upper and a shoelace disposed on the first embodiment.

Referring to FIGS. 1 to 3, the jig unit 1 includes a rotary stage 11, and a clamp device 12 that is disposed on the rotary stage 11 and that permits the shoe upper 9 to be disposed thereon.

The rotary stage 11 includes a bottom seat 13, a rotary plate 14 that is rotatably mounted on the bottom seat 13 and that permits the clamp device 12 to be disposed thereon, and a rotary actuator 5 that is mounted to the bottom seat 13 and that is for driving rotation of the rotary plate 14 relative to the bottom seat 13.

The clamp device 12 includes a base seat 15 that is mounted on the rotary plate 14, two spaced-apart clamp mechanisms 16 that are disposed on the base seat 15 and that are for respectively holding the lace stay pieces 91 of the shoe upper 9, and a lever mechanism 17 that is disposed on the base seat 15, that is located between the clamp mechanisms 16, and that is for hanging the tongue loop 94 of the shoe upper 9.

In one embodiment, each of the clamp mechanisms 16 includes a clamp stand 161 that is disposed on the base seat 15, an inner jaw 162 that is mounted to the clamp stand 161, and an outer jaw 163 that is mounted to the clamp stand 161 and that is movable relative to the inner jaw 162. The configuration of each of the clamp mechanisms 16 is not limited to such. In a variation, the inner jaw 162 of each of the clamp mechanisms 16 may be movably mounted to the lever mechanism 17, and the outer jaw 163 of each of the clamp mechanisms 16 may be fixedly mounted to the base seat 15.

In one embodiment, the lever mechanism 17 includes a lever stand 171 that is disposed on the base seat 15, a lever member 172 that is pivoted to the lever stand 171, and a hook member 173 that is telescopically mounted to the lever member 172 and that is located between the inner jaws 162 of the clamp mechanisms 16. The configuration of the lever mechanism 17 is not limited to such.

The robotic arm unit 2 is disposed at the proximity of the jig unit 1, and is for gripping and moving the tipping members 81 of the shoelace 8. The robotic arm unit 2 includes an arm module 21, and two spaced-apart grip modules 22 that are connected to the arm module 21.

The arm module 21 includes a mounting seat 23 that is fixedly mounted to a supporting structure (not shown), and an upper arm mechanism 24 that is movably mounted to the mounting seat 23.

The grip modules 22 are mounted to a distal end of the upper arm mechanism 24 opposite to the mounting seat 23. Each of the grip modules 22 includes a grip seat 25, and two spaced-apart grip mechanisms 26 each of which is telescopically mounted to the grip seat 25 and is operable to hold or release one of the tipping members 81 of the shoelace 8.

The machine vision unit 3 is for detecting the positions of the eyelets 93 of the shoe upper 9, and outputting corresponding coordinate signals. The machine vision unit 3 includes an illumination module 31 that is disposed on the jig unit 1, an image-capture module 32 that is disposed on one of the jig unit 1 and the robotic arm unit 2, and an image-computing module 33. The illumination module 31 emits light that passes through the eyelets 93 of the shoe upper 9.

In one embodiment, the machine vision unit 3 outputs a coordinate signal related to the positions of two of the eyelets 93 of the shoe upper 9 each time. In a variation, the machine vision unit 3 may output a coordinate signal related to the position of only one of the eyelets 93 of the shoe upper 9 each time.

In one embodiment, the illumination module 31 includes two lamps 311 that are disposed on the rotary plate 14 of the rotary stage 11, but is not limited to such. In a variation, the illumination module 31 may be configured as an LED (light-emitting diode) lamp that is disposed on the hook member 173 of the lever mechanism 17.

In one embodiment, the image-capture module 32 includes two cameras 321 that are disposed on the rotary plate 14 of the rotary stage 11, but is not limited to such. In a variation, the image-capture module 32 may be configured as a micro camera that is disposed between the grip modules 22.

The control unit 4 controls the robotic arm 2 to pass the tipping members 81 of the shoelace 8 through the eyelets 93 of the shoe upper 9 (i.e., to secure the shoelace 8 onto the shoe upper 9).

The control unit 4 is operable to emit a capture signal. The image-capture module 32 captures an image upon reception of the capture signal emitted from the control unit 4, and outputs a digital image related to the eyelets 93 of the shoe upper 9. The image-computing module 33 receives and processes the digital image output from the image-capture module 32, and outputs the coordinate signal (related to the positions of two of the eyelets 93 of the shoe upper 9).

The control unit 4 emits a drive signal upon reception of the coordinate signal output from the image-computing module 33. The upper arm mechanism 24 of the arm module 21 moves the grip modules 22 to a designated position upon reception of the drive signal emitted from the control unit 4, and then returns a ready signal.

The control unit 4 emits a lacing signal upon reception of the ready signal emitted from the upper arm mechanism 24. The upper arm mechanism 24 cooperates with the grip modules 22 for operating the shoelace 8 upon reception of the lacing signal emitted from the control unit 4, and then returns a finish signal.

The control unit 4 emits a rotating signal upon reception of the finish signal emitted from the upper arm mechanism 24. The rotary actuator 5 rotates the rotary plate 14 upon reception of the rotating signal emitted from the control unit 4, so that the shoe upper 9 is rotated relative to the robotic arm unit 2 by an angle. In one embodiment, the rotary plate 14 rotates about an axis that is orthogonal to an imaginary straight line that joins the two eyelets 93 of the shoe upper 9 related to the coordinate signal.

The automatic shoe-lacing machine performs a series of lacing operations for securing the shoelace 8 onto the shoe upper 9.

Initially, each of the lace stay pieces 91 of the shoe upper 9 is disposed between and firmly held by the inner jaw 162 and the outer jaw 163 of a respective one of the clamp mechanisms 16. At the same time, the tongue loop 94 of the shoe upper 9 is hung on the hook member 173 of the lever mechanism 17 so that the shoe upper 9 is firmly held on the rotary plate 14.

Then, the shoelace 8 runs through one of the eyelets 93 of each of the lace stay pieces 91 that is closest to a head portion of the shoe upper 9 (see FIG. 5), and the tipping members 81 of the shoelace 8 are respectively held by the grip modules 22. It should be noted that each of the tipping members 81 is held by both of the grip mechanisms 26 of the corresponding one of the grip modules 22. Each of the grip mechanisms 26 is independently operable to hold or release the corresponding tipping member 81.

Figure 6:
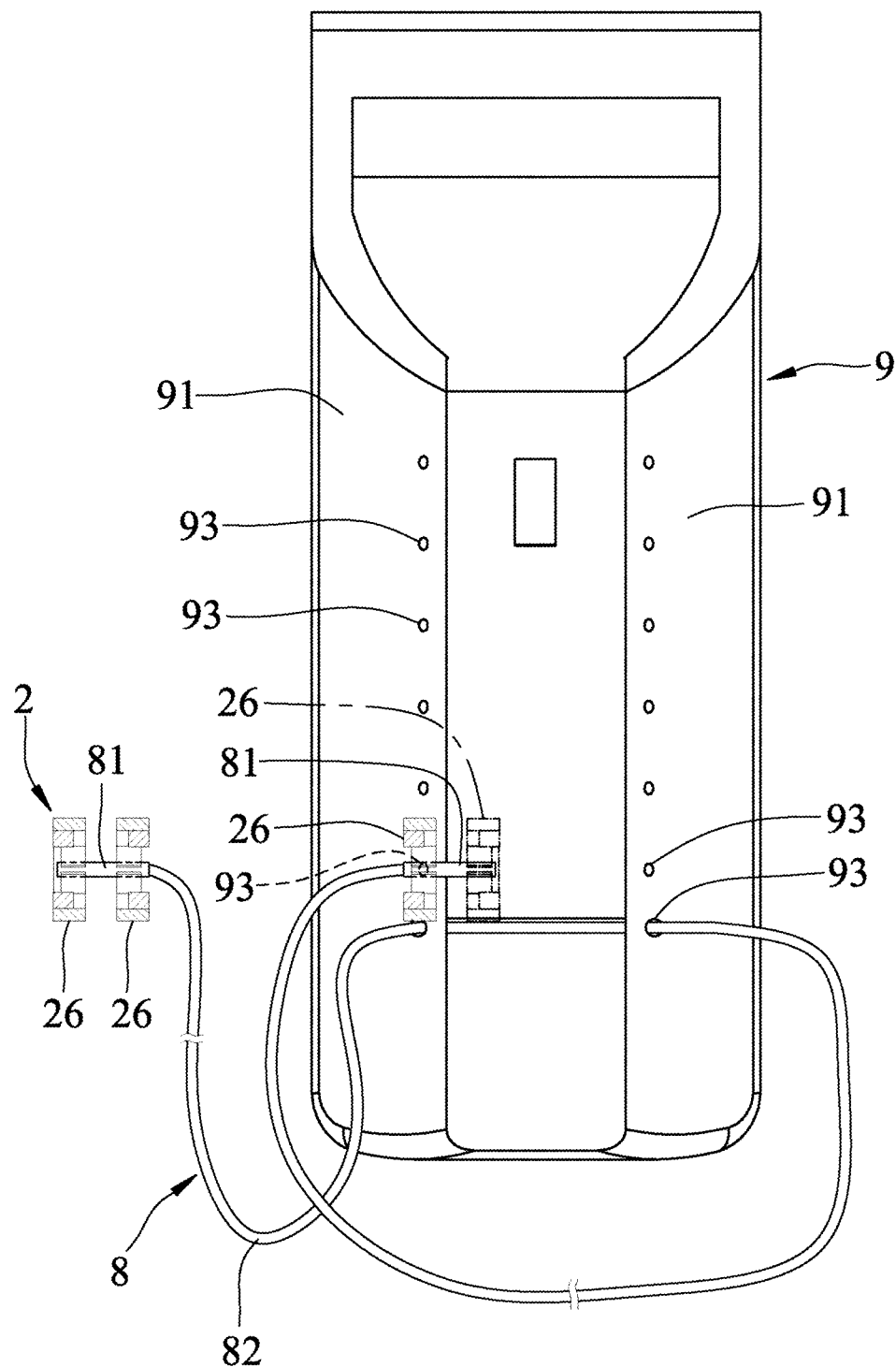

Referring to FIGS. 5 and 6, during each lacing operation, the machine vision unit 3 first detects the positions of two eyelets 93 through which the tipping members 81 of the shoelace 8 would be operated to respectively pass. After the machine vision unit 3 finishes detecting the positions of the two eyelets 93, the upper arm mechanism 24 of the arm module 21 moves the grip modules 22 such that one of the tipping members 81 is adjacent to a corresponding one of the two eyelets 93.

When the one of the tipping members 81 is moved to the proximity of the corresponding eyelet 93, one of the grip mechanisms 26 of the corresponding grip module 22 that is closer to the corresponding eyelet 93 releases the one of the tipping members 81 and retracts toward the grip seat 25 (see FIG. 3), and the upper arm mechanism 24 moves the one of the tipping members 81 to pass the corresponding eyelet 93.

When a major portion of the one of the tipping members 81 has passed the corresponding eyelet 93, the retracted grip mechanism 26 extends to hold the one of the tipping members 81 again, and the other one of the grip mechanism 26 of the corresponding grip module 22 releases the one of the tipping members 81 and retracts toward the grip seat 25 (see FIG. 3), so as to permit the upper arm mechanism 24 to move the one of the tipping members 81 to wholly pass through the corresponding eyelet 93.

After the one of the tipping members 81 passes through the corresponding eyelet 93, both of the grip mechanisms 26 of the corresponding grip module 22 hold the one of the tipping members 81.

Figure 7:
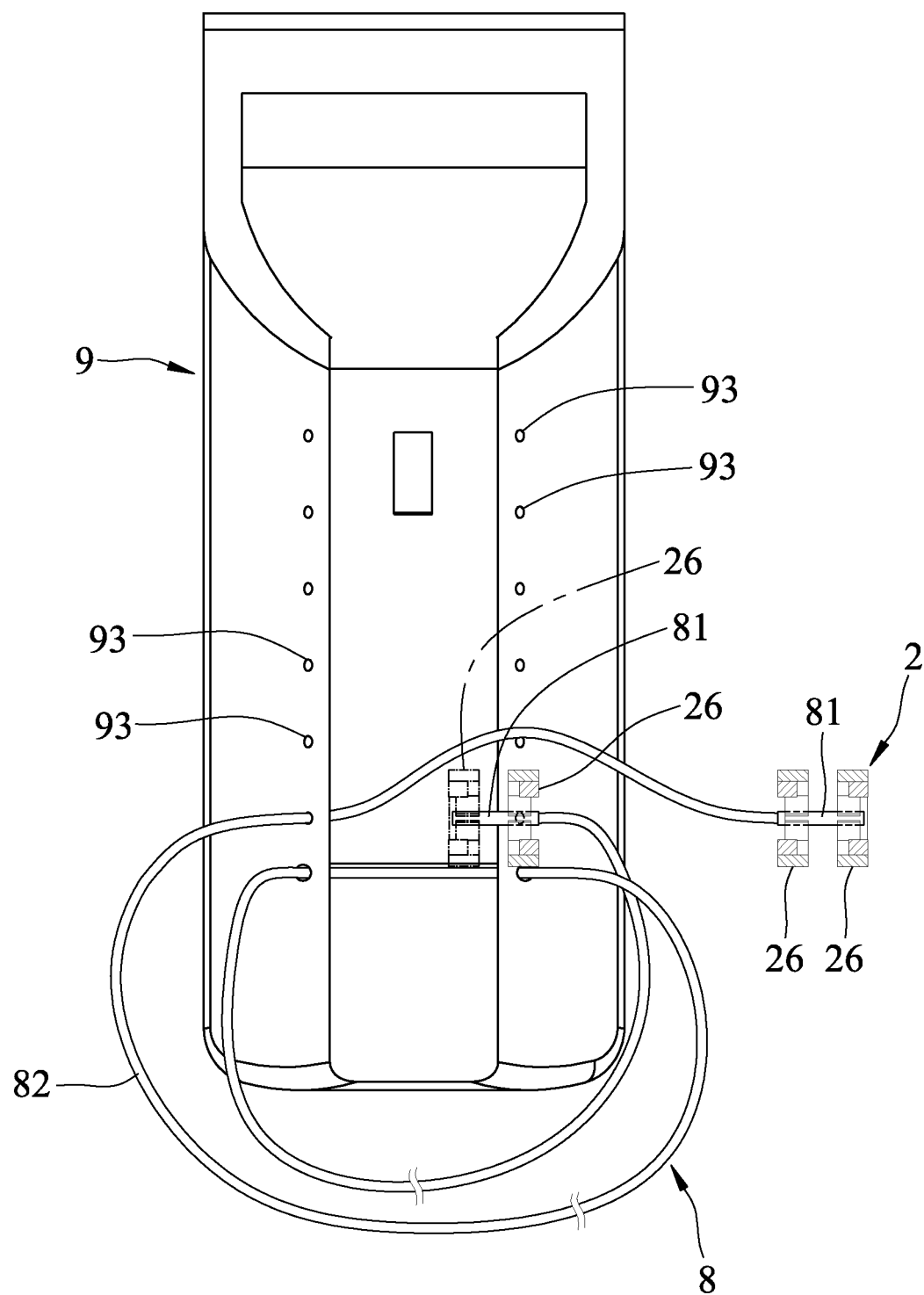

Referring to FIG. 7, afterward, the upper arm mechanism 24 of the arm module 21 moves the other one of the tipping members 81 to the proximity of the other one of the eyelets 93, and cooperates with the other one of the grip modules 22 to pass the other one of the tipping members 81 through the other one of the eyelets 93 in a manner similar to the above.

Figure 8:
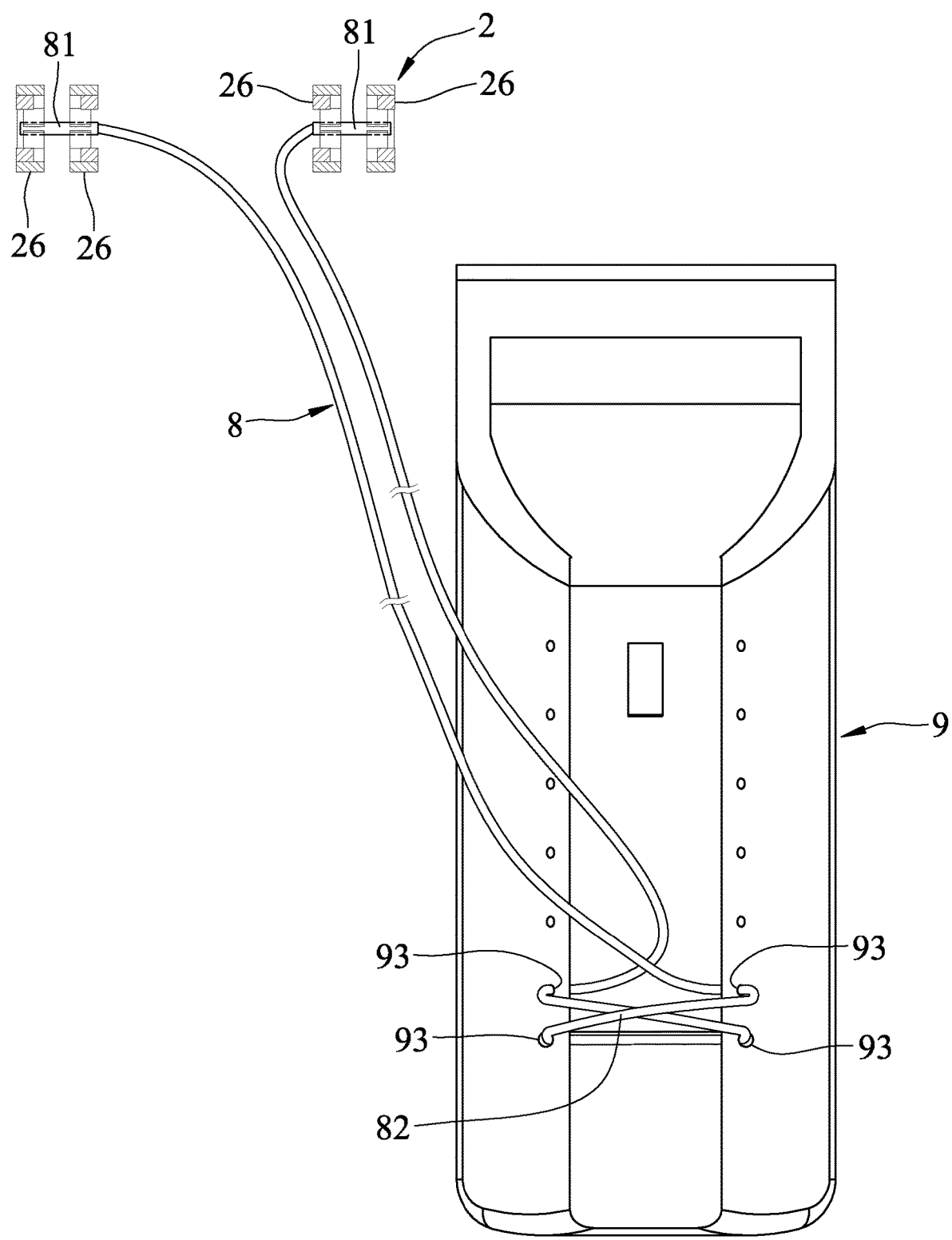

Referring to FIG. 8, after the tipping members 81 respectively pass through the two eyelets 93, the upper arm mechanism 24 moves the tipping members 81 away from the shoe upper 9 so as to stretch a plurality of joined segments of the lace body 82 of the shoelace 8 each of which joins two corresponding eyelets 93 of the shoe upper 9. It should be noted that, at this time, two free end segments of the lace body 82 that respectively connected the tipping members 81 are crossed (see FIG. 8).

Figure 9:
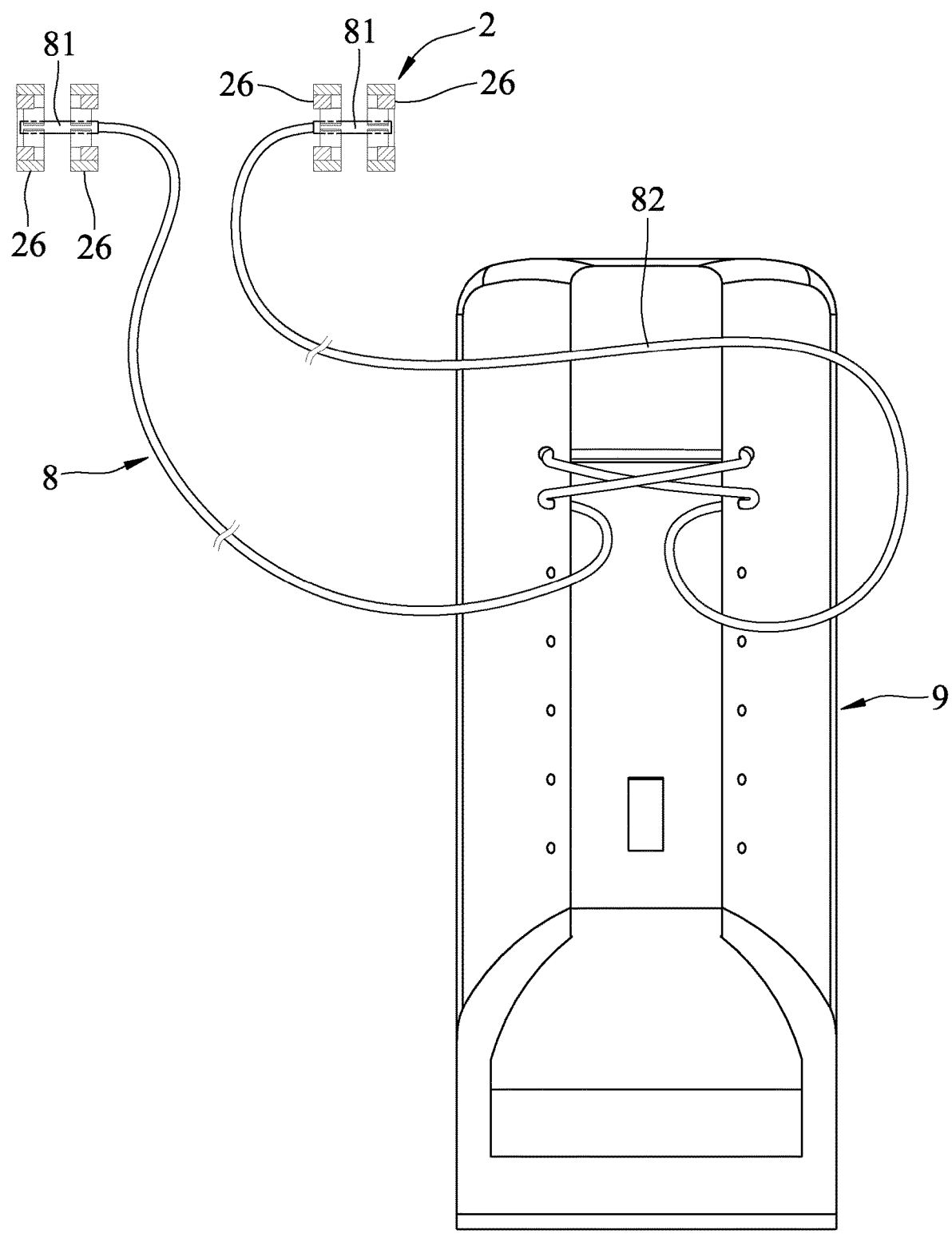

Referring to FIG. 9, the rotary plate 14 (see FIG. 3) of the rotary stage 11 is then driven to rotate clockwise by 180 degrees, so as to rotate the shoe upper 9 relative to the tipping members 81 by 180 degrees. As such, the two free end segments of the lace body 82 are not crossed (see FIG. 9), and the lacing operation is done once. In practice, the rotary plate 14 may be drive to rotate clockwise or counterclockwise by any desired angle.

Figure 10:
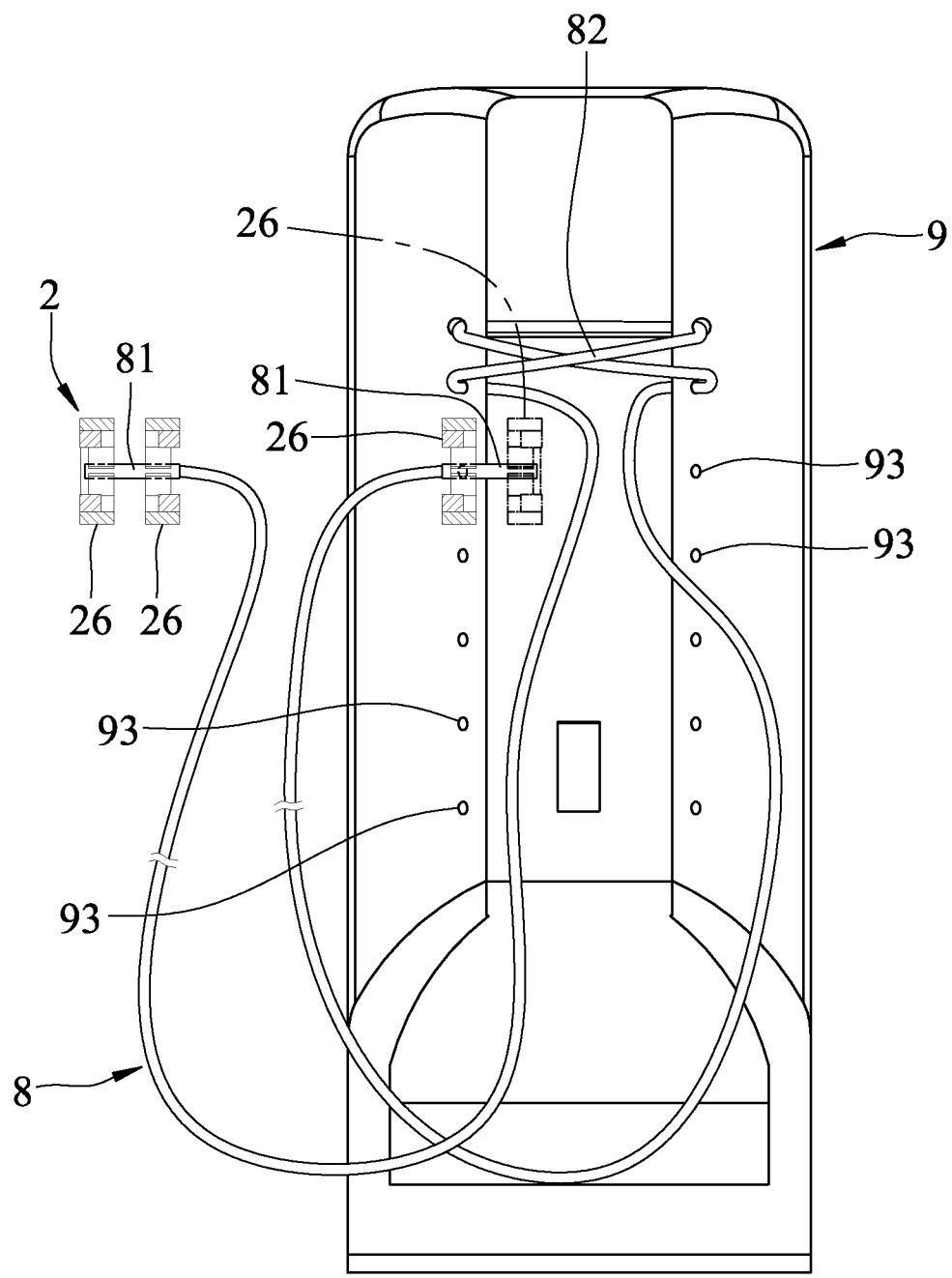
Figure 11:
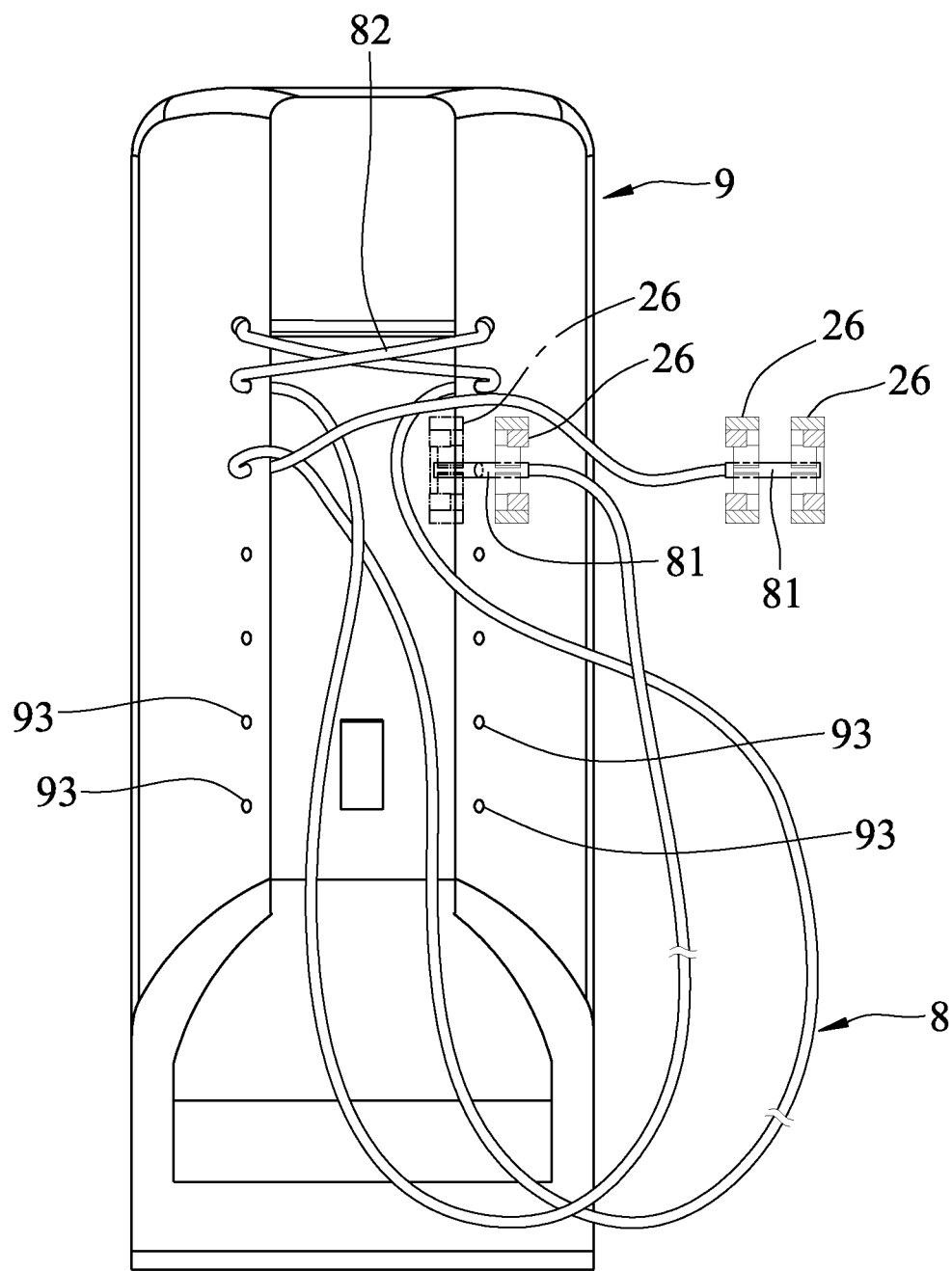
Figure 12:
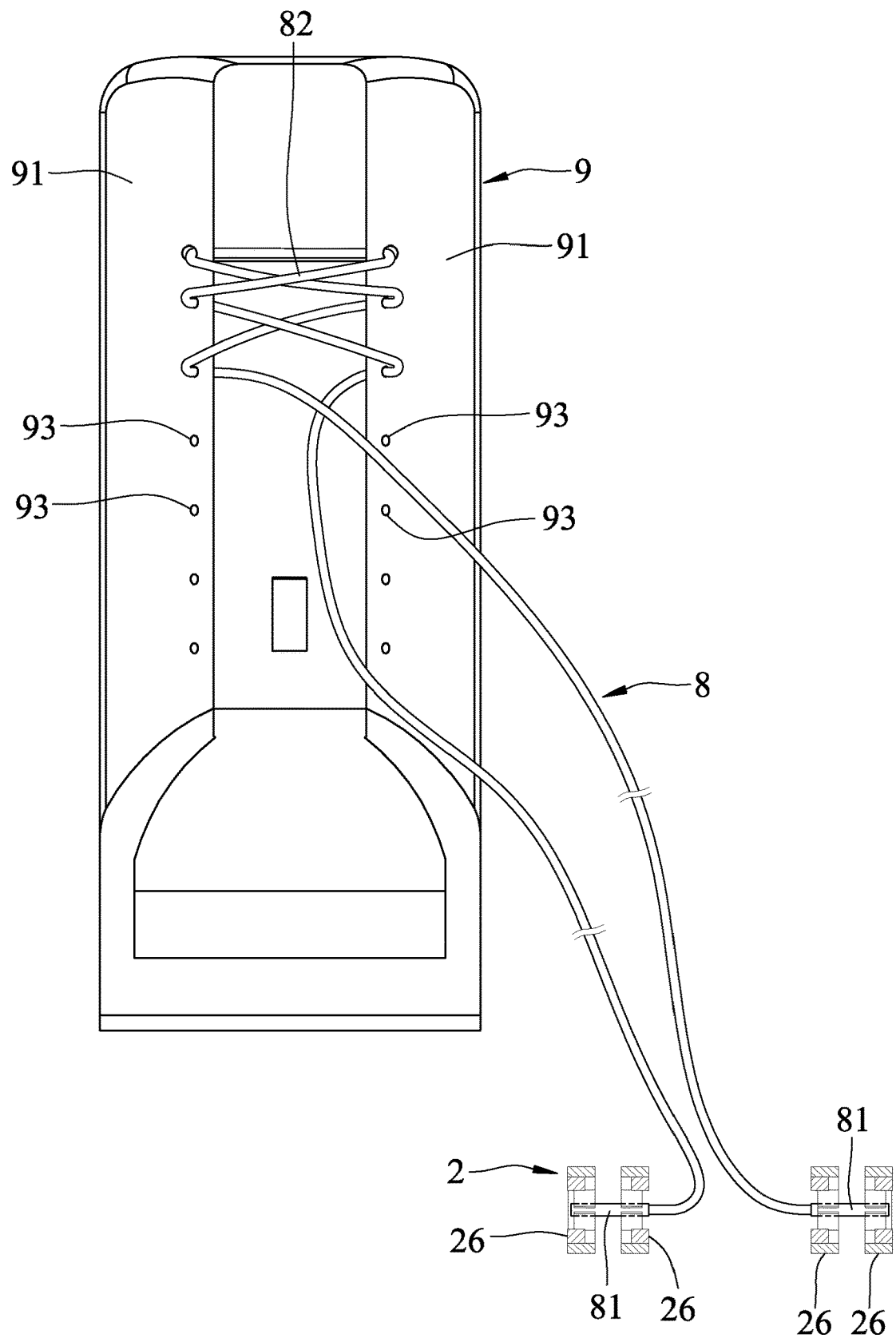

Referring to FIGS. 10 to 12, during the next lacing operation, the machine vision unit 3 determines the positions of the next two eyelets 93 through which the tipping members 81 would be operated to respectively pass by capturing a new digital image, or by mapping of the previous digital image. The control unit 4 then controls the robotic arm unit 2 to respectively pass the tipping members 81 through the next two eyelets 93, and to move the tipping members 81 away from the shoe upper 9 before the rotary plate 14 is rotated by 180 degrees again. The abovementioned lacing operation is repeated until the tipping members 81 pass through all the eyelets 93 of the shoe upper 9, so as to secure the shoelace 8 into the shoe upper 9.

It should be noted that, during each lacing operation, the order in which the tipping members 81 sequentially pass through the eyelets 93 would determine the manner in which the joined segments of the lace body 82 are crossed. For example, during each lacing operation, if the eyelet 93 at the left side of the drawing (see FIGS. 5 to 12) is passed through by one of the tipping members 81 before the eyelet 93 at the right side of the drawing being passed through by the other one of the tipping members 81, the joined segments of the lace body 82 may be crossed in the manner shown in FIG. 12. If the eyelets 93 are pass through in a different order during at least one of the lacing operations, the joined segments of the lace body 82 may be crossed in a manner different from that shown in FIG. 12.

Accordingly, a method for securing the shoelace 8 onto the shoe upper 9 by the first embodiment of the automatic shoe-lacing machine includes steps of:

(A) holding the shoe upper 9 firmly;

(B) holding the tipping members 81 of the shoelace 8 by the robotic arm unit 2;

(C) capturing a digital image that is related to the eyelets 93 of the shoe upper 9 by the machine vision unit 3, and determining the positions of two of the eyelets 93 through which the tipping members 81 of the shoelace 8 would be operated to respectively pass by the machine vision unit 3 via the digital image;

(D) passing the tipping members 81 respectively through the two eyelets 93 by the robotic arm unit 2, and moving the tipping members 81 away from the shoe upper 9 by the robotic arm unit 2 such that two free end segments of the lace body 82 that respectively connected the tipping members 81 are crossed;

(E) rotating the shoe upper 9 relative to the tipping members 81 substantially by 180 degrees such that the two free end segments of the lace body 82 are not crossed; and (F) repeating steps (C) to (E) until the tipping members 81 pass through all the eyelets 93 of the shoe upper 9.

The advantages of this disclosure are as follows:

1. The robotic arm unit 2 simultaneously moves the tipping members 81, so that two halves of the lace body 82 that are respectively connected to the tipping members 81 are substantially simultaneously operated to run through the corresponding eyelets 93 of the shoe upper 9, and are prevented from being tangled. Therefore, the robotic arm unit 2 moves along a relatively simple path and within a relatively small range. Compared with the conventional shoe-lacing machine, the automatic shoe-lacing machine according to the disclosure is more efficient.

2. The machine vision unit 3 automatically outputs coordinate signals upon detecting the positions of the eyelets 93 of the shoe upper 9, and the control unit 4 controls the robotic arm unit 2 to sequentially move the tipping members 81 to the accurate positions upon reception of the coordinate signals, so that each of the tipping members 81 can be smoothly passed through the corresponding eyelets 93. No additional manpower is needed for adjusting the relative position between each of the tipping members 81 and the corresponding eyelets 93.

Figure 13:
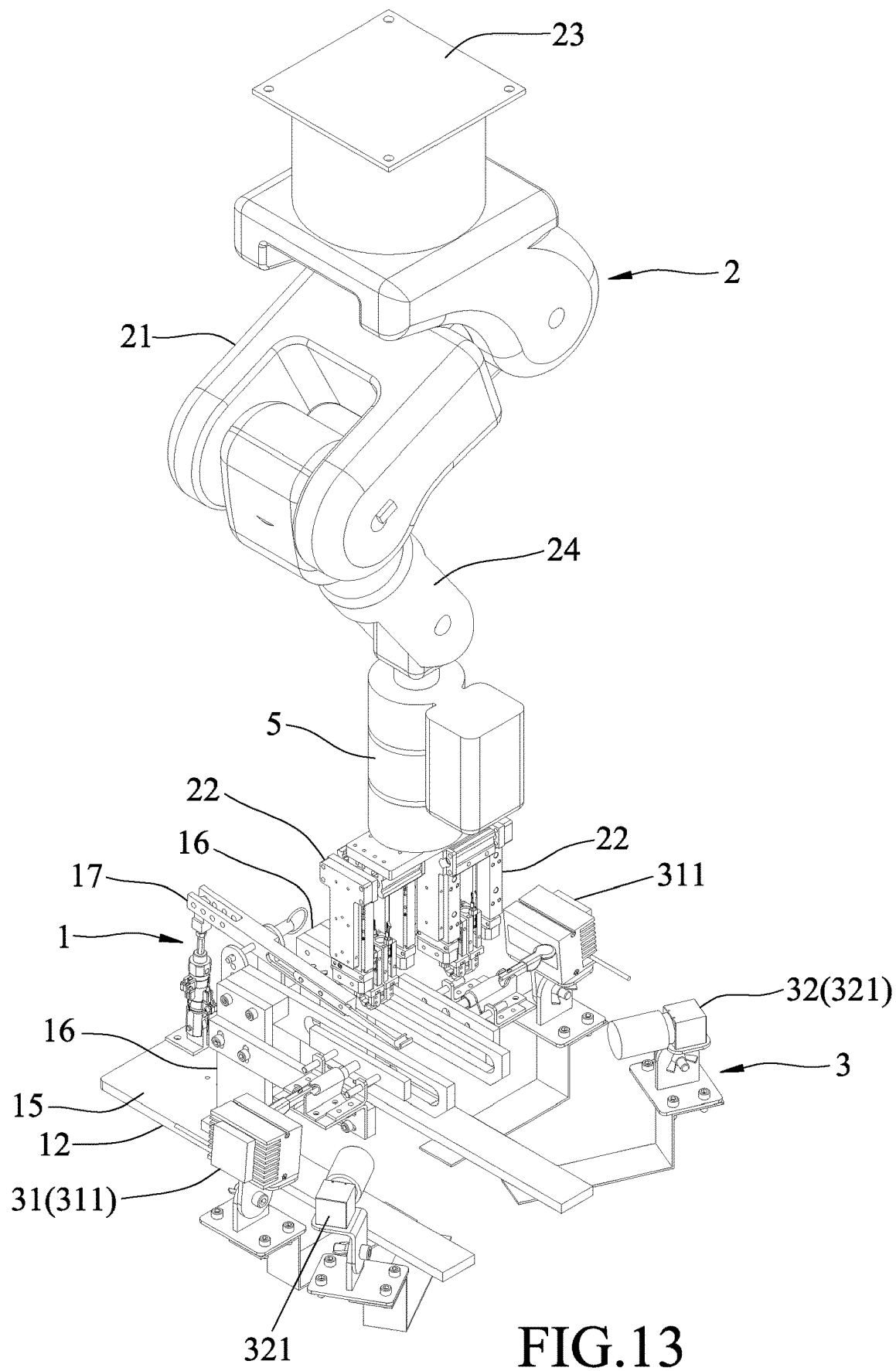
FIG. 13 is a perspective view illustrating a second embodiment of the automatic shoe-lacing machine according to the disclosure.
Figure 14:
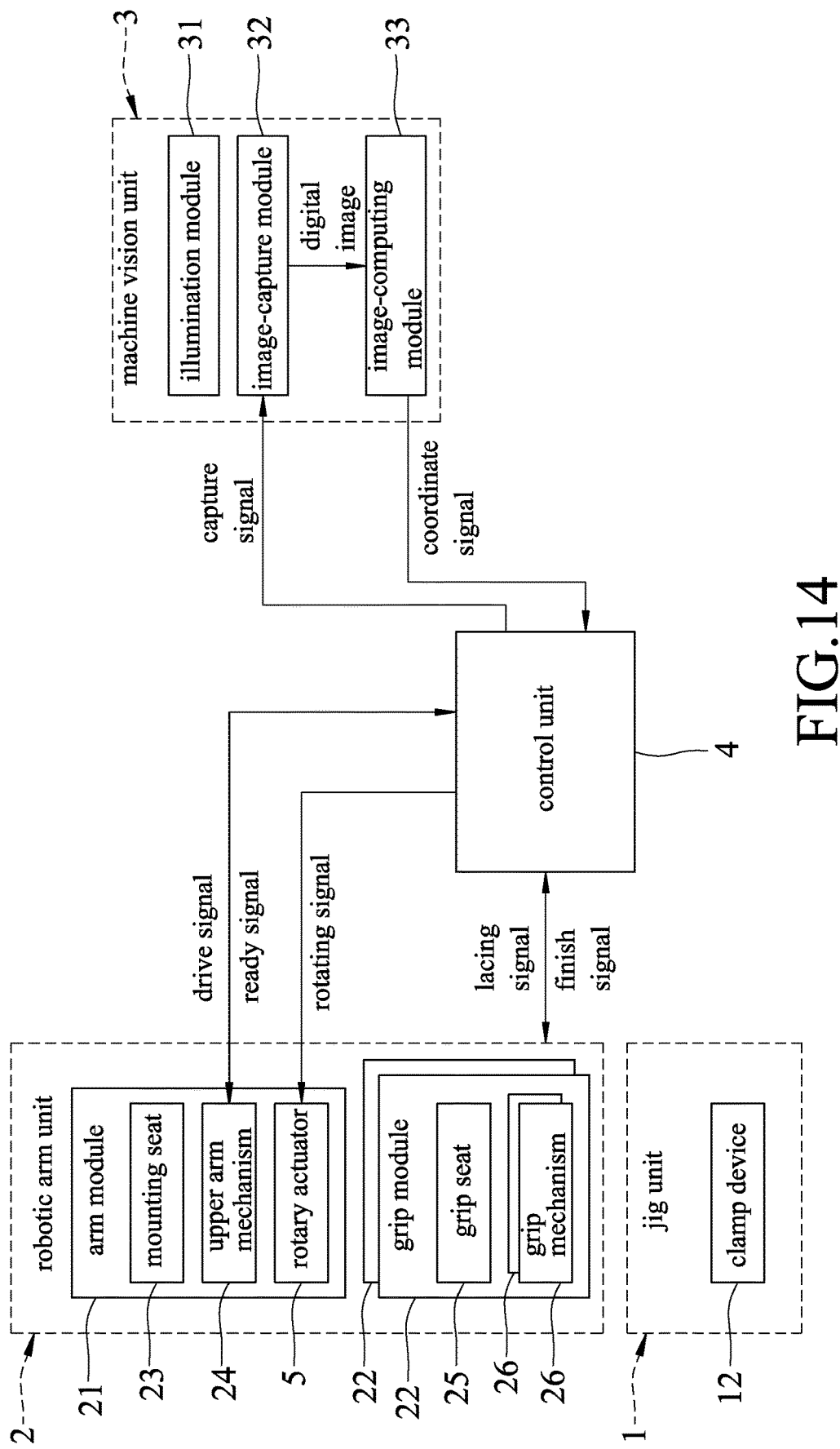
FIG. 14 is a block diagram illustrating the elements of the second embodiment.

Referring to FIGS. 13 and 14, the second embodiment of the automatic shoe-lacing machine according to the disclosure is similar to the first embodiment.

In the second embodiment, the rotary stage 11 (see FIG. 3) of the jig unit 1 is omitted, and the rotary actuator 5 is connected among the grip modules 22 and the upper arm mechanism 24 for rotating the grip modules 22 relative to the upper arm mechanism 24.

In this embodiment, the illumination module 31 includes two lamps 311 that are disposed on the base seat 15 of the clamp device 12, but is not limited to such. The image-capture module 32 includes two cameras 321 that are disposed on the base seat 15, but is not limited to such.

The second embodiment of the automatic shoe-lacing machine performs a series of lacing operations similar to those of the first embodiment for securing the shoelace 8 onto the shoe upper 9. During each lacing operation, the control unit 4 controls the rotary actuator 5 to rotate the grip modules 22 relative to the shoe upper 9 after the tipping members 81 respectively pass through the corresponding eyelets 93 and are moved away from the shoe upper 9, such that the two free end segments of the lace body 82 are not crossed. In one embodiment, the grip modules 22 rotate about an axis that is orthogonal to an imaginary straight line that joins the two corresponding eyelets 93 of the shoe upper 9.

A method for securing the shoelace 8 onto the shoe upper 9 by the second embodiment of the automatic shoe-lacing machine includes steps of:

(A) holding the shoe upper 9 firmly;

(B) holding the tipping members 81 of the shoelace 8 by the robotic arm unit 2;

(C) capturing a digital image that is related to the eyelets 93 of the shoe upper 9 by the machine vision unit 3, and determining the positions of two of the eyelets 93 through which the tipping members 81 of the shoelace 8 would be operated to respectively pass by the machine vision unit 3 via the digital image;

(D) passing the tipping members 81 respectively through the two eyelets 93 by the robotic arm unit 2, and moving the tipping members 81 away from the shoe upper 9 by the robotic arm unit 2 such that two free end segments of the lace body 82 that respectively connected the tipping members 81 are crossed;

(E) rotating the tipping members 81 relative to the shoe upper 9 substantially by 180 degrees such that the two free end segments of the lace body 82 are not crossed; and (F) repeating steps (C) to (E) until the tipping members 81 pass through all the eyelets 93 of the shoe upper 9.

Since the rotary stage 11 (see FIG. 3) of the first embodiment is omitted in the second embodiment, the second embodiment of the automatic shoe-lacing machine is relatively compact, and provide greater flexibility to the layout of a production line.

In an embodiment, the disclosure relates to an automatic shoe-lacing machine that is for securing a shoelace onto a shoe upper, and that includes a jig unit, a robotic arm unit and a control unit. The shoelace has a flexible lace body, and two tipping members that are respectively connected to two opposite ends of the lace body. The shoe upper has two spaced-apart lace stay pieces. Each of the lace stay pieces is formed with a plurality of spaced-apart eyelets. The jig unit permits the shoe upper to be disposed thereon. The robotic arm unit is disposed at the proximity of the jig unit. The robotic arm unit simultaneously holds and moves the tipping members of the shoelace for sequentially passing the tipping members through the eyelets of the shoe upper. The control unit controls the movement of the robotic arm unit.

In a further embodiment, the disclosure relates to at least one of the preceding embodiments, wherein the robotic arm unit includes an arm module, and two spaced-apart grip modules that are connected to the arm module and that are for respectively holding the tipping members. The arm module and the grip modules are controlled by the control unit for sequentially passing the tipping members through the eyelets of the shoe upper.

In a further embodiment, the disclosure relates to at least one of the preceding embodiments, wherein the arm module includes a fixed mounting seat, and an upper arm mechanism that is movably mounted to the mounting seat. The grip modules are mounted to a distal end of the upper arm mechanism opposite to the mounting seat. Each of the grip modules includes a grip seat, and two spaced-apart grip mechanisms each of which is telescopically mounted to the grip seat and is operable to hold or release one of the tipping members of the shoelace.

In a further embodiment, the disclosure relates to at least one of the preceding embodiments, wherein the automatic shoe-lacing machine further includes a machine vision unit that is for detecting the positions of the eyelets of the shoe upper. The machine vision unit includes an illumination module that is disposed on the jig unit, an image-capture module that is disposed on one of the jig unit and the robotic arm unit, and an image-computing module. The illumination module emitting light that passes through the eyelets of the shoe upper.

In a further embodiment, the disclosure relates to at least one of the preceding embodiments, wherein the machine vision unit is operable to output a coordinate signal that is related to the position of at least one of the eyelets of the shoe upper. The control unit emits a drive signal upon reception of the coordinate signal output from the machine vision unit. The upper arm mechanism of the arm module moves the grip modules to a designated position upon reception of the drive signal emitted from the control unit, and then returns a ready signal. The control unit emits a lacing signal upon reception of the ready signal emitted from the upper arm mechanism. The upper arm mechanism cooperates with the grip modules for operating the shoelace upon reception of the lacing signal emitted from the control unit, and then returns a finish signal to the control unit.

In a further embodiment, the disclosure relates to at least one of the preceding embodiments, wherein the control unit is operable to emit a capture signal. The image-capture module captures an image upon reception of the capture signal emitted from the control unit, and outputs a digital image that is related to the eyelets of the shoe upper. The image-computing module receives and processes the digital image output from the image-capture module, and outputs the coordinate signal.

In a further embodiment, the disclosure relates to at least one of the preceding embodiments, wherein the jig unit includes a rotary stage, and a clamp device that is disposed on the rotary stage and that permits the shoe upper to be disposed thereon. The rotary stage includes a bottom seat, a rotary plate that is rotatably mounted on the bottom seat and that permits the clamp device to be disposed thereon, and a rotary actuator that is mounted to the bottom seat and that is for driving rotation of the rotary plate relative to the bottom seat. The control unit is operable to emit a rotating signal. The rotary actuator rotates the rotary plate upon reception of the rotating signal emitted from the control unit, so as to rotate the shoe upper relative to the robotic arm unit by an angle.

In a further embodiment, the disclosure relates to at least one of the preceding embodiments, wherein the jig unit includes a clamp device that permits the shoe upper to be disposed thereon. The arm module includes an upper arm mechanism, and a rotary actuator that is connected among the grip modules and the upper arm mechanism for rotating the grip modules relative to the upper arm mechanism. The control unit is operable to emit a rotating signal. The rotary actuator rotates the grip modules relative to the shoe upper upon reception of the rotating signal emitted from the control unit, so as to rotate the grip modules relative to the shoe upper by an angle.

In a further embodiment, the disclosure relates to at least one of the preceding embodiments, wherein the rotary plate rotates about an axis that is orthogonal to an imaginary straight line that joins two of the eyelets of the shoe upper.

In a further embodiment, the disclosure relates to at least one of the preceding embodiments, wherein the grip modules rotate about an axis that is orthogonal to an imaginary straight line that joins two of the eyelets of the shoe upper.

In a further embodiment, the disclosure relates to at least one of the preceding embodiments. The shoe upper further has a tongue that is located between the lace stay pieces. The tongue has an upper surface, and a tongue loop that is disposed on the upper surface. The clamp device includes a base seat, two spaced-apart clamp mechanisms that are disposed on the base seat and that are for respectively holding the lace stay pieces of the shoe upper, and a lever mechanism that is disposed on the base seat, that is located between the clamp mechanisms, and that is for hanging the tongue loop of the shoe upper.

In a further embodiment, the disclosure relates to at least one of the preceding embodiments, wherein each of the clamp mechanisms includes a clamp stand that is disposed on the base seat, an inner jaw that is mounted to the clamp stand, and an outer jaw that is mounted to the clamp stand and that is movable relative to the inner jaw. The lever mechanism includes a lever stand that is disposed on the base seat, a lever member that is pivoted to the lever stand, and a hook member that is telescopically mounted to the lever member and that is located between the inner jaws of the clamp mechanisms.

In a further embodiment, the disclosure relates to a method for securing a shoelace onto a shoe upper by an automatic shoe-lacing machine. The automatic shoe-lacing machine includes a robotic arm unit and a machine vision unit. The shoelace has a flexible lace body, and two tipping members that are respectively connected to two opposite ends of the lace body. The shoe upper has two spaced-apart lace stay pieces. Each of the lace stay pieces is formed with a plurality of spaced-apart eyelets. The method includes steps of: a) capturing, by the machine vision unit, a digital image that is related to the eyelets of the shoe upper, and determining, by the machine vision unit, the positions of two of the eyelets through which the tipping members of the shoelace would be operated to respectively pass via the digital image; b) passing, by the robotic arm unit, the tipping members respectively through the two eyelets, and moving, by the robotic arm unit, the tipping members away from the shoe upper such that two free end segments of the lace body that respectively connected the tipping members are crossed; c) holding, by the robotic arm unit, the tipping members and rotating the shoe upper and the robotic arm unit relative to each other, such that the two free end segments of the lace body are not crossed; and d) repeating steps a) to c) until the tipping members pass through all the eyelets of the shoe upper.

In a further embodiment, the disclosure relates to at least one of the preceding embodiments, wherein, in each execution of step c), the shoe upper and the robotic arm unit are rotated relative to each other in the same direction.

In a further embodiment, the disclosure relates to at least one of the preceding embodiments, wherein, in each execution of step c), the shoe upper and the robotic arm unit are rotated relative to each other by 180 degrees.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An automatic shoe-lacing machine adapted for securing a shoelace onto a shoe upper, the shoelace having a flexible lace body, and two tipping members that are respectively connected to two opposite ends of the lace body, the shoe upper having two spaced-apart lace stay pieces, each of the lace stay pieces being formed with a plurality of spaced-apart eyelets, said automatic shoe-lacing machine comprising:

a jig unit adapted to permit the shoe upper to be disposed thereon;

a robotic arm unit disposed at the proximity of said jig unit, said robotic arm unit being adapted to simultaneously hold and move the tipping members of the shoelace for sequentially passing the tipping members through the eyelets of the shoe upper; and a control unit controlling the movement of said robotic arm unit;

wherein said robotic arm unit includes an arm module, and two spaced-apart grip modules that are connected to the arm module and that are for respectively holding the tipping members, said arm module and said grip modules being controlled by the control unit for sequentially passing the tipping members through the eyelets of the shoe upper;

wherein said arm module includes an upper arm mechanism, said grip modules being mounted to a distal end of said upper arm mechanism;

wherein said automatic shoe-lacing machine further comprising a machine vision unit that is for detecting the positions of the eyelets of the shoe upper; and wherein said machine vision unit is operable to output a coordinate signal that is related to the position of at least one of the eyelets of the shoe upper, said control unit emitting a drive signal upon reception of the coordinate signal output from said machine vision unit, said upper arm mechanism of said arm module moving said grip modules to a designated position upon reception of the drive signal emitted from said control unit, and then returning a ready signal, said control unit emitting a lacing signal upon reception of the ready signal emitted from said upper arm mechanism, said upper arm mechanism cooperating with said grip modules for operating the shoelace upon reception of the lacing signal emitted from said control unit, and then returning a finish signal to said control unit.

2. The automatic shoe-lacing machine as claimed in claim 1, wherein said arm module further includes a fixed mounting seat that permits an end of said upper arm mechanism opposite to said grip modules to be movably mounted thereto, each of said grip modules including a grip seat, and two spaced-apart grip mechanisms each of which is telescopically mounted to said grip seat and is operable to hold or release one of the tipping members of the shoelace.

3. The automatic shoe-lacing machine as claimed in claim 1, wherein said machine vision unit includes an illumination module that is disposed on said jig unit, an image-capture module that is disposed on one of said jig unit and said robotic arm unit, and an image-computing module, said illumination module emitting light that passes through the eyelets of the shoe upper.

4. The automatic shoe-lacing machine as claimed in claim 3, wherein said control unit is operable to emit a capture signal, said image-capture module capturing an image upon reception of the capture signal emitted from said control unit, and outputting a digital image that is related to the eyelets of the shoe upper, said image-computing module receiving and processing the digital image output from said image-capture module, and outputting the coordinate signal.

5. The automatic shoe-lacing machine as claimed in claim 1, wherein said jig unit includes a rotary stage, and a clamp device that is disposed on said rotary stage and that permits the shoe upper to be disposed thereon, said rotary stage including a bottom seat, a rotary plate that is rotatably mounted on said bottom seat and that permits said clamp device to be disposed thereon, and a rotary actuator that is mounted to said bottom seat and that is for driving rotation of said rotary plate relative to said bottom seat, said control unit being operable to emit a rotating signal, said rotary actuator rotating said rotary plate upon reception of the rotating signal emitted from said control unit, so as to rotate the shoe upper relative to said robotic arm unit by an angle.

6. The automatic shoe-lacing machine as claimed in claim 1, wherein said jig unit includes a clamp device that permits the shoe upper to be disposed thereon, said arm module further including a rotary actuator that is connected among said grip modules and said upper arm mechanism for rotating said grip modules relative to said upper arm mechanism, said control unit being operable to emit a rotating signal, said rotary actuator rotating said grip modules relative to the shoe upper upon reception of the rotating signal emitted from said control unit, so as to rotate said grip modules relative to the shoe upper by an angle.

7. The automatic shoe-lacing machine as claimed in claim 5, wherein said rotary plate rotates about an axis that is orthogonal to an imaginary straight line that joins two of the eyelets of the shoe upper.

8. The automatic shoe-lacing machine as claimed in claim 6, wherein said grip modules rotate about an axis that is orthogonal to an imaginary straight line that joins two of the eyelets of the shoe upper.

9. The automatic shoe-lacing machine as claimed in claim 5, the shoe upper further having a tongue that is located between the lace stay pieces, the tongue having an upper surface, and a tongue loop that is disposed on the upper surface, wherein said clamp device includes a base seat, two spaced-apart clamp mechanisms that are disposed on said base seat and that are for respectively holding the lace stay pieces of the shoe upper, and a lever mechanism that is disposed on said base seat, that is located between said clamp mechanisms, and that is for hanging the tongue loop of the shoe upper.

10. The automatic shoe-lacing machine as claimed in claim 9, wherein each of said clamp mechanisms includes a clamp stand that is disposed on said base seat, an inner jaw that is mounted to said clamp stand, and an outer jaw that is mounted to said clamp stand and that is movable relative to said inner jaw, said lever mechanism including a lever stand that is disposed on said base seat, a lever member that is pivoted to said lever stand, and a hook member that is telescopically mounted to said lever member and that is located between said inner jaws of said clamp mechanisms.

11. The automatic shoe-lacing machine as claimed in claim 6, the shoe upper further having a tongue that is located between the lace stay pieces, the tongue having an upper surface, and a tongue loop that is disposed on the upper surface, wherein said clamp device includes a base seat, two spaced-apart clamp mechanisms that are disposed on said base seat and that are for respectively holding the lace stay pieces of the shoe upper, and a lever mechanism that is disposed on said base seat, that is located between said clamp mechanisms, and that is for hanging the tongue loop of the shoe upper.

12. The automatic shoe-lacing machine as claimed in claim 11, wherein each of said clamp mechanisms includes a clamp stand that is disposed on said base seat, an inner jaw that is mounted to said clamp stand, and an outer jaw that is mounted to said clamp stand and that is movable relative to said inner jaw, said lever mechanism including a lever stand that is disposed on said base seat, a lever member that is pivoted to said lever stand, and a hook member that is telescopically mounted to said lever member and that is located between said inner jaws of said clamp mechanisms.

13. A method for securing a shoelace onto a shoe upper by an automatic shoe-lacing machine, the automatic shoe-lacing machine including a robotic arm unit and a machine vision unit, the shoelace having a flexible lace body, and two tipping members that are respectively connected to two opposite ends of the lace body, the shoe upper having two spaced-apart lace stay pieces, each of the lace stay pieces being formed with a plurality of spaced-apart eyelets, said method comprising steps of:
  a) capturing, by the machine vision unit, a digital image that is related to the eyelets of the shoe upper, and determining, by the machine vision unit, the positions of two of the eyelets through which the tipping members of the shoelace would be operated to respectively pass via the digital image;
  b) passing, by the robotic arm unit, the tipping members respectively through the two eyelets, and moving, by the robotic arm unit, the tipping members away from the shoe upper such that two free end segments of the lace body that respectively connected the tipping members are crossed;
  c) holding, by the robotic arm unit, the tipping members and rotating the shoe upper and the robotic arm unit relative to each other, such that the two free end segments of the lace body are not crossed; and
  d) repeating steps a) to c) until the tipping members pass through all the eyelets of the shoe upper.

14. The method as claimed in claim 13, wherein, in each execution of step c), the shoe upper and the robotic arm unit are rotated relative to each other in the same direction.

15. The method as claimed in claim 14, wherein, in each execution of step c), the shoe upper and the robotic arm unit are rotated relative to each other by 180 degrees.

* * * * *